United States Patent
Maaref et al.

(10) Patent No.: US 10,548,071 B2
(45) Date of Patent: *Jan. 28, 2020

(54) SYSTEM AND METHOD FOR COMMUNICATING TRAFFIC OVER LICENSED OR UN-LICENSED SPECTRUMS BASED ON QUALITY OF SERVICE (QOS) CONSTRAINTS OF THE TRAFFIC

(71) Applicant: Huawei Technologies Co., Ltd., Shenzhen (CN)

(72) Inventors: Amine Maaref, Kanata (CA); Mohamed Adel Salem, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,069

(22) Filed: Mar. 26, 2015

(65) Prior Publication Data

US 2015/0334643 A1 Nov. 19, 2015

Related U.S. Application Data

(60) Provisional application No. 61/994,734, filed on May 16, 2014.

(51) Int. Cl.
*H04W 48/18* (2009.01)
*H04W 72/08* (2009.01)
(Continued)

(52) U.S. Cl.
CPC .......... *H04W 48/18* (2013.01); *H04B 1/0003* (2013.01); *H04W 72/087* (2013.01);
(Continued)

(58) Field of Classification Search
CPC . H04W 16/14; H04W 72/0453; H04W 48/18; H04W 72/087
See application file for complete search history.

(56) References Cited

U.S. PATENT DOCUMENTS

| | | | |
|---|---|---|---|
| 7,512,094 B1 | 3/2009 | Linebarger et al. | |
| 7,590,093 B1 | 9/2009 | Goyal et al. | |

(Continued)

FOREIGN PATENT DOCUMENTS

| | | |
|---|---|---|
| CN | 101616419 A | 12/2009 |
| CN | 101682530 A | 3/2010 |

(Continued)

OTHER PUBLICATIONS

International Search Report and Written Opinion received in International Application No. PCT/CN2015/077813 dated Aug. 5, 2015, 10 pages.

(Continued)

*Primary Examiner* — Romani Ohri
(74) *Attorney, Agent, or Firm* — Slater Matsil, LLP (57) ABSTRACT

Assigning traffic to be transported over either the primary band or the complementary band of a unified air interface based on quality of service (QoS) constraints of the traffic may allow for improved network resource utilization efficiency. In one example, traffic having deterministic QoS constraints is assigned to the primary band, while traffic having statistical QoS constraints is assigned to the complementary band when the complementary band is capable of satisfying the statistical QoS constraints of the traffic. If a condition on the complementary band prevents it from satisfying the statistical QoS constraint of the traffic, then the traffic is assigned to the primary band.

29 Claims, 6 Drawing Sheets

(51) Int. Cl.
  *H04B 1/00* (2006.01)
  *H04W 16/14* (2009.01)
  *H04W 72/04* (2009.01)
  *H04W 76/15* (2018.01)
(52) U.S. Cl.
  CPC ........ *H04W 16/14* (2013.01); *H04W 72/0453* (2013.01); *H04W 76/15* (2018.02)

(56) References Cited

U.S. PATENT DOCUMENTS

| | | | |
|---|---|---|---|
| 8,126,473 B1* | 2/2012 | Kim | H04L 12/40045 455/422.1 |
| 8,428,038 B1 | 4/2013 | Buttles | |
| 8,442,066 B2 | 5/2013 | Jeon et al. | |
| 9,264,846 B2 | 2/2016 | Stromberg et al. | |
| 2004/0013089 A1 | 1/2004 | Taneja et al. | |
| 2004/0203815 A1 | 10/2004 | Shoemake et al. | |
| 2006/0056365 A1 | 3/2006 | Das et al. | |
| 2006/0251026 A1 | 11/2006 | Kalhan | |
| 2006/0281404 A1 | 12/2006 | Lee et al. | |
| 2007/0026868 A1* | 2/2007 | Schulz | H04M 3/2227 455/454 |
| 2007/0133482 A1 | 6/2007 | Garnnan | |
| 2007/0275657 A1 | 11/2007 | Chang et al. | |
| 2008/0039089 A1* | 2/2008 | Berkman | H04W 36/04 455/436 |
| 2008/0069242 A1 | 3/2008 | Xu et al. | |
| 2008/0176518 A1 | 7/2008 | Pascht et al. | |
| 2008/0220787 A1 | 9/2008 | Stanwood et al. | |
| 2008/0298275 A1* | 12/2008 | De Sousa | H04W 16/18 370/255 |
| 2009/0073924 A1 | 3/2009 | Chou | |
| 2009/0088164 A1 | 4/2009 | Shen et al. | |
| 2009/0092105 A1 | 4/2009 | Chou | |
| 2009/0109921 A1 | 4/2009 | Bowen | |
| 2009/0175214 A1 | 7/2009 | Sfar et al. | |
| 2009/0258607 A1 | 10/2009 | Beninghaus et al. | |
| 2010/0184435 A1 | 7/2010 | Shellhammer et al. | |
| 2010/0227606 A1 | 9/2010 | Nan et al. | |
| 2010/0260266 A1 | 10/2010 | Gholmieh et al. | |
| 2011/0028102 A1 | 2/2011 | Li et al. | |
| 2011/0158096 A1 | 6/2011 | Leung et al. | |
| 2011/0165896 A1 | 7/2011 | Stromberg et al. | |
| 2011/0176478 A1 | 7/2011 | Inohiza | |
| 2011/0237238 A1 | 9/2011 | Hassan et al. | |
| 2011/0243060 A1 | 10/2011 | Mildh et al. | |
| 2011/0286343 A1 | 11/2011 | Powell et al. | |
| 2011/0305189 A1 | 12/2011 | Chen et al. | |
| 2012/0039284 A1 | 2/2012 | Barbieri et al. | |
| 2012/0077510 A1 | 3/2012 | Chen et al. | |
| 2012/0134328 A1* | 5/2012 | Gauvreau | H04L 5/0037 370/329 |
| 2012/0250631 A1* | 10/2012 | Hakola | H04L 5/001 370/329 |
| 2013/0016221 A1 | 1/2013 | Charbit et al. | |
| 2013/0023202 A1 | 1/2013 | Koskela et al. | |
| 2013/0059594 A1 | 3/2013 | Hui et al. | |
| 2013/0064198 A1 | 3/2013 | Krishnaswamy et al. | |
| 2013/0077501 A1 | 3/2013 | Krishnaswamy et al. | |
| 2013/0143541 A1 | 6/2013 | Henderson et al. | |
| 2013/0155991 A1 | 6/2013 | Kazmi et al. | |
| 2013/0156005 A1 | 6/2013 | Li et al. | |
| 2013/0165134 A1 | 6/2013 | Touag et al. | |
| 2013/0176934 A1 | 7/2013 | Malladi et al. | |
| 2013/0244666 A1 | 9/2013 | Carmon et al. | |
| 2013/0255991 A1 | 10/2013 | Snitchler et al. | |
| 2013/0286834 A1 | 10/2013 | Lee | |
| 2013/0295946 A1 | 11/2013 | Panchal et al. | |
| 2013/0295948 A1 | 11/2013 | Ye et al. | |
| 2013/0311673 A1* | 11/2013 | Karthikeyan | H04L 41/147 709/239 |
| 2013/0337821 A1* | 12/2013 | Clegg | H04L 5/0062 455/452.1 |
| 2013/0343288 A1 | 12/2013 | Ratasuk et al. | |
| 2014/0016570 A1 | 1/2014 | Ma et al. | |
| 2014/0023022 A1 | 1/2014 | Cheng et al. | |
| 2014/0031054 A1 | 1/2014 | Zou et al. | |
| 2014/0043979 A1 | 2/2014 | Etemad et al. | |
| 2014/0050086 A1 | 2/2014 | Himayat et al. | |
| 2014/0051467 A1 | 2/2014 | Tan et al. | |
| 2014/0092828 A1 | 4/2014 | Sirotkin | |
| 2014/0105115 A1 | 4/2014 | Ohayon et al. | |
| 2014/0169261 A1 | 6/2014 | Ming et al. | |
| 2014/0189091 A1* | 7/2014 | Tamasi | H04L 43/0858 709/224 |
| 2014/0233437 A1 | 8/2014 | Abdoli et al. | |
| 2014/0233472 A1* | 8/2014 | Kadel | H04W 4/028 370/329 |
| 2014/0269550 A1 | 9/2014 | Webb | |
| 2014/0282754 A1* | 9/2014 | Rehman | H04N 21/61 725/81 |
| 2014/0287769 A1* | 9/2014 | Taori | H04W 74/0808 455/450 |
| 2014/0294118 A1 | 10/2014 | Baik et al. | |
| 2014/0307552 A1 | 10/2014 | Elsherif et al. | |
| 2015/0009962 A1 | 1/2015 | Clegg | |
| 2015/0011226 A1 | 1/2015 | De Sousa | |
| 2015/0016318 A1 | 1/2015 | Lee et al. | |
| 2015/0067541 A1 | 3/2015 | Karande et al. | |
| 2015/0085741 A1 | 3/2015 | Sfar et al. | |
| 2015/0117468 A1 | 4/2015 | Shin et al. | |
| 2015/0131536 A1 | 5/2015 | Kaur et al. | |
| 2015/0146615 A1 | 5/2015 | Yu et al. | |
| 2015/0172931 A1* | 6/2015 | Jose | H04W 16/14 370/329 |
| 2015/0188665 A1 | 7/2015 | Chen et al. | |
| 2015/0189652 A1 | 7/2015 | Mizusawa | |
| 2015/0215133 A1 | 7/2015 | Cao et al. | |
| 2015/0237628 A1 | 8/2015 | Nerella et al. | |
| 2015/0264702 A1* | 9/2015 | Yang | H04W 72/0453 455/452.1 |
| 2015/0289270 A1* | 10/2015 | Knapp | H04L 27/0006 455/452.1 |
| 2015/0304146 A1 | 10/2015 | Yang et al. | |
| 2015/0319753 A1 | 11/2015 | Chen et al. | |
| 2016/0112157 A1 | 4/2016 | Li et al. | |
| 2016/0135143 A1 | 5/2016 | Won et al. | |
| 2016/0285537 A1 | 9/2016 | Maaref et al. | |
| 2016/0295477 A1* | 10/2016 | Zhu | H04W 48/18 |
| 2016/0353287 A1 | 12/2016 | Hassan et al. | |
| 2017/0118758 A1* | 4/2017 | Li | H04W 74/0833 |
| 2018/0199280 A1 | 7/2018 | Griot et al. | |

FOREIGN PATENT DOCUMENTS

| | | |
|---|---|---|
| CN | 101820632 A | 9/2010 |
| CN | 102474727 A | 5/2012 |
| CN | 102907153 | 1/2013 |
| CN | 102917448 A | 2/2013 |
| CN | 103188711 A | 7/2013 |
| CN | 103327552 A | 9/2013 |
| CN | 103370896 A | 10/2013 |
| CN | 103441779 A | 12/2013 |
| CN | 104041174 A | 9/2014 |
| EP | 1545144 A1 | 6/2005 |
| EP | 2741547 B1 | 9/2018 |
| JP | 2009246875 A | 10/2009 |
| JP | 2010505324 A | 2/2010 |
| JP | 2012516108 A | 7/2012 |
| JP | 2013062830 A | 4/2013 |
| JP | 2013534395 A | 9/2013 |
| JP | 2014500685 A | 1/2014 |
| JP | 2014502799 A | 2/2014 |
| JP | 2014207673 A | 10/2014 |
| KR | 20130126816 A | 11/2013 |
| KR | 20140017517 | 2/2014 |
| KR | 20140025435 | 3/2014 |
| RU | 2442288 C2 | 2/2012 |
| RU | 2449483 C2 | 4/2012 |
| RU | 2012141029 A | 3/2014 |
| WO | 0064106 A1 | 10/2000 |
| WO | 2010077631 A1 | 7/2010 |

(56) References Cited

FOREIGN PATENT DOCUMENTS

| WO | 2011162983 A1 | 12/2011 |
|---|---|---|
| WO | 2012039656 A1 | 3/2012 |
| WO | 2012058823 A1 | 5/2012 |
| WO | 2012078565 A1 | 6/2012 |
| WO | 2012144801 A2 | 10/2012 |
| WO | 2012171931 A1 | 12/2012 |
| WO | 2013103754 | 7/2013 |
| WO | 2013162615 A1 | 10/2013 |
| WO | 2014027496 | 2/2014 |
| WO | 2014066403 A1 | 5/2014 |
| WO | 2014070394 A1 | 5/2014 |

OTHER PUBLICATIONS

International Search Report and Written Opinion received in International Application No. PCT/CN2015/079076 dated Aug. 19, 2015, 11 pages.

International Search Report and Written Opinion received in International Application No. PCT/CN2015/078962 dated Aug. 20, 2015, 11 pages.

Lte, 3rd Generation Partnership Project; Technical Specification Group Services and System Aspects; Multimedia Broadcast/Multicase Service (MBMS); Protocols and Codecs (Release 13), 3GPP TS 26.346 v13.0.0, Mar. 2015, 207 pages.

Byers, J.W., et al., "A Digital Fountain Approach to Reliable Distribution of Bulk Data," (date unknown), 15 pages.

Kushwaha, H., et al., "Reliable Multimedia Transmission Over Cognitive Radio Networks Using Fountain Codes," Proceedings of the IEEE, vol. 96, No. 1, Jan. 2008, 11 pages.

Luby, Michael G., et al., "Efficient Erasure Correcting Codes," IEEE Transactions of Information Theory, vol. 47, No. 2, Feb. 2001, pp. 569-584.

Luby, Michael, "LT Codes," Proceedings of the 43rd Annual IEEE Symposium on Foundations of Computer Science (FOCS '02), 2002, 10 pages.

Shokrollahi, Amin, "Raptor Codes," IEEE Transactions of Information Theory, vol. 52, No. 6, Jun. 2006, pp. 2551-2567.

"New SID: Study on Licensed-Assisted Access using LTE," 3GPP TSG RAN Meeting #63, RP-140481, Fukuoka, Japan, Mar. 3-6, 2014, 8 pages.

"New SID: Study on Licensed-Assisted Access using LTE," 3GPP TSG RAN Meeting #63, RP-140240, Fukuoka, Japan, Mar. 3-6, 2014, 8 pages.

Dikmese et al., "Spectrum sensing and resource allocation for multicarrier cognitive radio systems under interference and power constraints", EURASIP Journal of Advances in Signal Processing 2014, May 12, 2014, 12 pages.

Huawei et al., "Motiviation of the New SI Proposal: Study on Licensed-Assisted Access using LTE," 3GPP TSG RAN Meeting #63, RP-140214, Mar. 2014, 9 pages, Fukuoka, Japan.

Ericsson et al., "Study on Licensed-Assisted Access Using LTE Motivation," 3GPP TSG RAN Meeting #63, RP-140260, Mar. 2014, 8 Pages, Fukuoka, Japan.

IEEE Standard for Information technology—Telecommunications and information exchange between systems—Local and metropolitan area networks—Specific requirements, Part 11: Wireless LAN Medium Access Control (MAC) and Physical Later (PHY) Specifications, Amendment 5 : Enhancements for Higher Throughput, IEEE Computer Society, 802.11n, Oct. 2009, 536 Pages.

IEEE Standard for Local and metropolitan area networks, Part 16: Air Interface for Broadband Wireless Access Systems, IEEE Computer Society and IEEE Microwave Theory and Techniques Society, 802.16, May 2009, 2082 Pages.

\* cited by examiner

SYSTEM AND METHOD FOR COMMUNICATING TRAFFIC OVER LICENSED OR UN-LICENSED SPECTRUMS BASED ON QUALITY OF SERVICE (QOS) CONSTRAINTS OF THE TRAFFIC

This patent application claims priority to U.S. Provisional Application No. 61/994,734, filed on May 16, 2014 and entitled "System and Method for Integrated Licensed-Unlicensed QoS-Driven Spectrum Access," which is hereby incorporated by reference herein as if reproduced in its entirety.

TECHNICAL FIELD

The present invention relates generally to managing the allocation of resources in a network, and in particular embodiments, to system and methods for communicating traffic over licensed or un-licensed spectrums based on quality of service (QoS) constraints of the traffic.

BACKGROUND

Governmental bodies reserve bands of wireless spectrum for different uses. For example, the Federal Communications Commission (FCC), the International Telecommunication Union (ITU), and other regulatory agencies reserve some portions of the spectrum for licensed activities (e.g., radio, television, satellite, mobile telecommunication, etc.), while reserving other portions of the spectrum for unlicensed activities. The licensed spectrums may be subject to regulations set forth by the regulatory agency, as well as to operating protocols agreed upon by the public and/or private entities engaging in the licensed activity. The spectrum reserved for unlicensed communications may also be subject to regulations set forth by the corresponding regulatory agency, particularly with regards to transmission power and shared access.

SUMMARY OF THE INVENTION

Technical advantages are generally achieved, by embodiments of this disclosure which describe system and methods for communicating traffic over licensed or un-licensed spectrums based on quality of service (QoS) constraints of the traffic.

Technical advantages are generally achieved, by embodiments of this disclosure which describe system and methods for communicating traffic over licensed or un-licensed spectrums based on quality of service (QoS) constraints of the traffic.

In accordance with an embodiment, a method for allocating traffic over licensed and unlicensed bands is provided. In this example, the method includes identifying a unified air interface extending between a transmit point and a receive point. The unified air interface is adapted to transport wireless signals spanning both a primary band licensed for cellular communication and a complementary band reserved for unlicensed communication. The method further includes generating traffic assignments for traffic communicated over the unified air interface. The traffic assignments assign the traffic to be transported over either the primary band or the complementary band in accordance with a quality of service (QoS) parameter of the traffic. The method further includes communicating the traffic assignments to the transmit point or the receive point. An apparatus for performing this method is also provided.

In accordance with another embodiment, a method for communicating traffic over licensed and unlicensed bands is provided. In this example, the method includes establishing a unified air interface between a transmit point and a receive point. The unified air interface is adapted to transport wireless signals spanning both a primary band licensed for cellular communication and a complementary band reserved for unlicensed communication. The method further includes receiving traffic assignments from a scheduler. The traffic assignments assign traffic communicated over the unified air interface to either the primary band or the complementary band in accordance with a quality of service (QoS) parameter of the traffic. The method further includes communicating data over the unified air interface in accordance with the traffic assignments. An apparatus for performing this method is also provided.

In accordance with yet another embodiment, a method for receiving traffic over licensed and unlicensed bands is provided. In this example, the method includes establishing a unified air interface between a transmit point and a receive point. The unified air interface is adapted to transport wireless signals spanning both a primary band licensed for cellular communication and a complementary band reserved for unlicensed communication. The method further includes receiving traffic over the unified air interface. The traffic is received over the primary band when a quality of service (QoS) requirement of the traffic meets a first criteria, and the traffic is received over the complementary band when the QoS requirement of the traffic meets a second criteria. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Many wireless telecommunication protocols, such as the long term evolution (LTE) advanced (LTE-A) protocol, operate exclusively in frequency bands licensed for cellular communications, which are collectively referred to as the "primary band" throughout this disclosure. Other wireless telecommunications protocols, such as Wi-Fi protocol, operate exclusively in the unlicensed band, which is referred to as the "complementary band" throughout this disclosure. The term "licensed band" may be used interchangeably with the term "primary band," and the term "unlicensed band" may be used interchangeably with the term "complementary band." Notably, the frequency bands licensed for cellular transmission may change from time to time, and the term "primary band" may also refer to frequency bands that are re-licensed for cellular transmission after the filing of this application. The complementary band may include spectrums reserved for non-telecom purposes, such as the industrial, scientific and medical (ISM) band. Telecommunication protocols operating over the primary band often provide more reliable data transmissions, while telecommunication protocols operating over the complementary band are often capable of supporting low latency high volume transmissions, albeit with reduced reliability.

A unified air interface configured to transport wireless transmissions spanning portions of both the primary and complementary bands is described in U.S. patent application Ser. No. 14/669,333 , now U.S. Publication No. 2015/0334642, which is incorporated by reference herein as if reproduced in its entirety. Aspects of this disclosure provide techniques for communicating traffic over either the primary band or the complementary band of that unified air interface based on a quality of service (QoS) constraints of the traffic. In some embodiments, traffic having deterministic QoS constraints is assigned to the primary band, while traffic having statistical QoS constraints is assigned to the complementary band when the complementary band is capable of satisfying the statistical QoS constraints of the traffic. If a condition on the complementary band prevents it from satisfying the statistical QoS constraint of the traffic, then the traffic may be assigned to the primary band. Other criteria for assigning traffic to the primary and complementary band may also be used. These and other details are discussed in greater detail below.

As used herein, the term "unified air interface" refers to an air interface sharing a common physical and medium access control (MAC) connection, as may be consistent with an interface operating in accordance with a common radio access technology (RAT), such as a cellular radio access network (RAN) in an fifth generation (5G) LTE system. In some embodiments, a unified air interface includes at least two spectrum-type dependent air interface configurations, including one air interface configuration for a primary band licensed for cellular communication, and one air interface configuration for a complementary band reserved for unlicensed communication.

Figure 1:
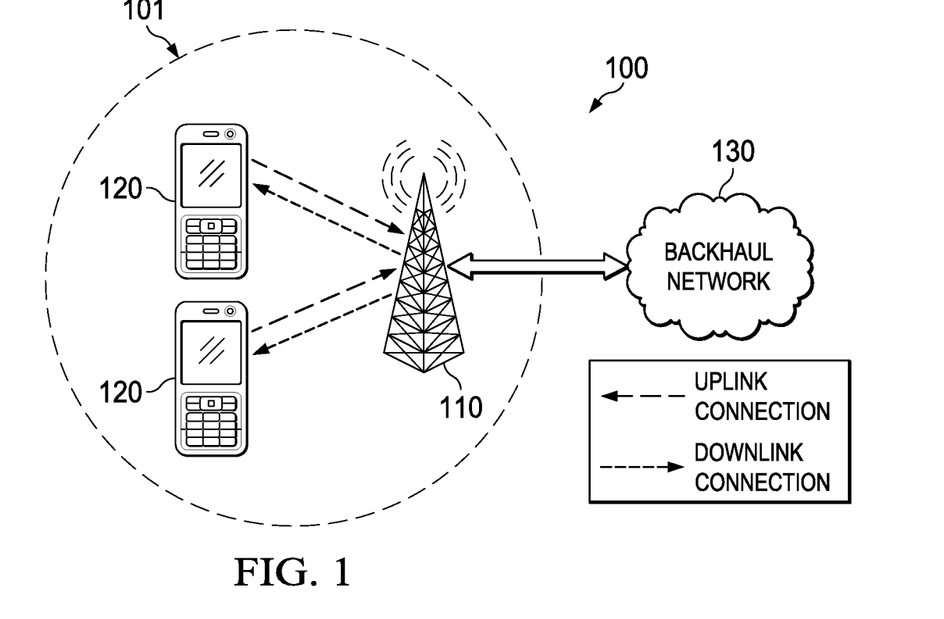
FIG. 1 illustrates a diagram of an embodiment wireless communications network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
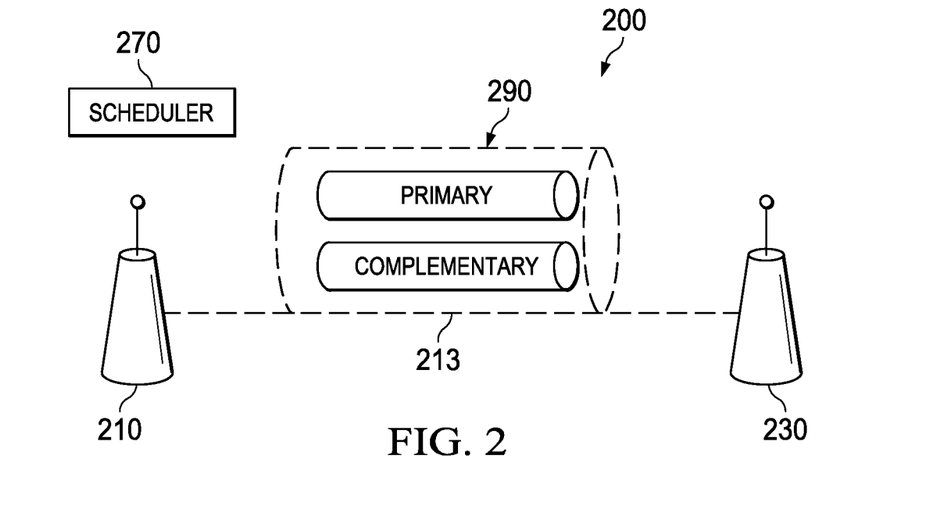
FIG. 2 illustrates a diagram of an embodiment wireless network adapted to transport wireless transmissions spanning portions of both the primary and complementary spectrums over an adaptable air interface.

As discussed in U.S. patent application Ser. No. 14/669,333 , an unified air interface that supports wireless transmissions spanning portions of both the primary and complementary spectrums can be established between a transmit point and a receive point. FIG. 2 illustrates an embodiment wireless network 200 adapted for communicating wireless transmissions spanning portions of both the primary and complementary spectrums. As shown, the wireless network 200 comprises a transmit point 210, a receive point 230, and a scheduler 270. The transmit point 210 may be any device adapted to emit a wireless transmission, and the receive point 230 may be any device adapted to receive the wireless signal transmitted by the transmit point 210. For example, the transmit point 210 may be a base station, a relay station, or a mobile station. Likewise, receive point 230 may also be a base station, a relay station, or a mobile station.

A unified air interface 213 is established between the transmit point 210 and the receive point 230, and is adapted to carry a wireless transmission 290 that spans at least a portion of the primary band and a portion of the complementary band. The wireless transmission 290 may be any type of wireless signal. For example, the wireless transmission 290 may be a downlink signal, an uplink signal, a device-to-device signal, a signal communicated over a wireless backhaul link (e.g., between neighboring base stations, etc.), or any other wireless signal communicated between a transmit point and a receive point. The wireless transmission 290 may also have different transmission formats/characteristics. For example, the wireless transmission 290 may be a unicast transmission, a multi-cast transmission, or a broadcast transmission. As another example, the wireless transmission may include single-layer signaling and/or multi-layer signaling communicated from a single antenna or from multiple antennas, e.g., single-user (SU) multiple input multiple output (MIMO) transmissions, multi-user MIMO transmissions, etc.

The scheduler 270 may be a control plane entity adapted to schedule traffic over the unified air interface 213. In some embodiments, the scheduler 270 is an integrated component on the transmit point 210. For instance, the transmit point 210 may be a base station, and the scheduler 270 may be an on-board component of the base station adapted to schedule downlink transmissions. In other embodiments, the scheduler 270 is an integrated component on the receive point 230. For instance, the receive point 230 may be a base station, and the scheduler 270 may be an on-board component of the base station adapted to schedule uplink transmissions from the transmit point 210. In yet other embodiments, the scheduler 270 is independent from the transmit point 210 and the receive point 210. As one example, the scheduler 270 may be a centralized controller adapted to perform scheduling for a cluster of base stations. As another example, the transmit point 210 and/or the receive point 230 may be a low power node, and the scheduler 270 may be an on-board component of a macro-base station adapted to perform scheduling for the low power node. As yet another example, the transmit point 210 and the receive point 230 may be mobile devices or machines, and the scheduler 270 may be an on-board component of a base station adapted to perform scheduling for device-to-device (D2D) or machine-to-machine (M2M) transmissions between the transmit point 210 and the receive point 230. Other implementations are also possible.

In an embodiment, the scheduler 270 may schedule traffic having deterministic QoS constraints to be transported over the primary band, and schedule traffic having statistical QoS constraints to be transported over the complementary band when the complementary band is capable of satisfying the statistical QoS constraint of the traffic. As discussed herein, a "deterministic QoS constraint" requires that every packet in a traffic flow be communicated in a manner that satisfies a QoS requirement, while a "statistical QoS constraint" can be satisfied even if some packets (e.g., a fraction of the total packets) are communicated in a manner that violates a QoS requirement. For example, a deterministic latency requirement is satisfied when each packet in the flow is communicated within a delay bound. Conversely, a statistical latency requirement may be satisfied when a certain percentage of the packets are communicated within a delay bound.

Figure 3:
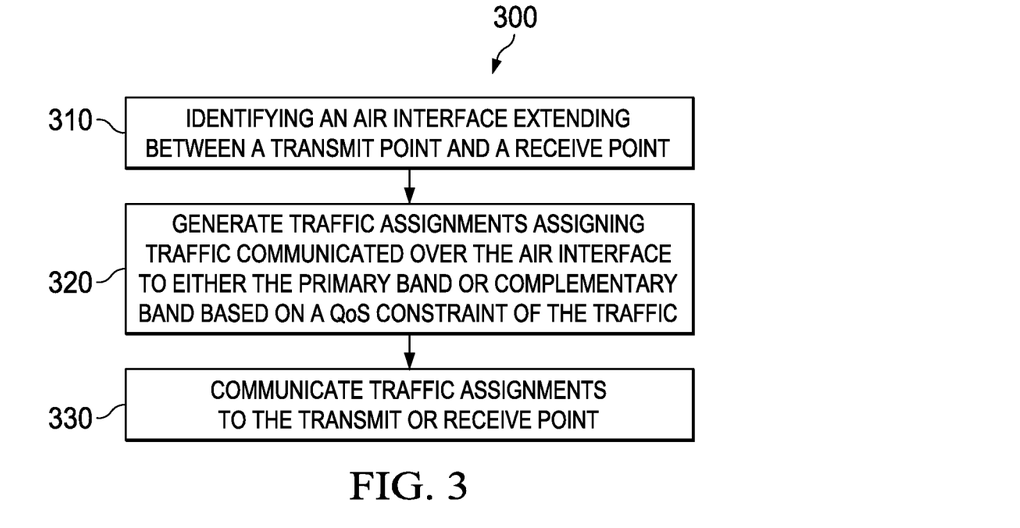
FIG. 3 illustrates a flowchart of an embodiment method for assigning traffic to be communicated over either the primary or complementary band of an adaptive air interface.

Aspects of this disclosure provide techniques for assigning traffic communicated over a unified air interface to either the primary or complementary band based on a quality of service (QoS) constraint of the traffic. FIG. 3 illustrates a method 300 for assigning traffic to be communicated over either the primary or complementary band, as might be performed by a scheduler. As shown, the method 300 begins at step 310, where the scheduler identifies a unified air interface extending between a transmit point and a receive point. Next, the method 300 proceeds to step 320, where the scheduler generates traffic assignments that assign traffic to be communicated over either the primary band or the complementary band of the unified air interface based on a QoS constraint of the traffic. In one embodiment, traffic having deterministic QoS constraints is assigned to the primary band, while traffic having statistical QoS constraints is assigned to the complementary band when the complementary band is capable of satisfying the statistical QoS constraint of the traffic.

In other embodiments, traffic is assigned to the primary band when a QoS constraint of the traffic satisfies a criteria, e.g., exceeds a priority level, jitter requirement exceeds a threshold, packet-loss rate requirement exceeds a threshold, latency requirement exceeds a threshold, etc. In such embodiments, traffic may be assigned to the complementary when the QoS constraint fails to satisfy the criteria so long as the complementary band is capable of satisfying the QoS constraint of the traffic. If the complementary band cannot satisfy the QoS constraint of the traffic, then the traffic is assigned to the primary band.

Whether or not the complementary band is capable of satisfying a QoS constraint (statistical or otherwise) may depend on a variety of factors. In some embodiments, the capability of the complementary band to satisfy a given QoS constraint depends at least in part on a condition of the complementary band. For example, the complementary band may be able to satisfy a given QoS constraint when a contention level is below a threshold. As another example, the complementary band may be able to satisfy a given QoS constraint when a data queue buffering traffic waiting to be sent over the complementary band is below a threshold. In other embodiments, the capability of the complementary band to satisfy a given QoS constraint depends at least in part on a configuration of the complementary band, e.g., listen-before-talk parameters, transmit power constraints, the width of the spectrum spanning the complementary band, the amount of grant-less resources available for contention-based access, etc.

After the traffic assignments are generated, the method 300 proceeds to step 330, where the scheduler communicates the traffic assignments to the transmit point or the receive point. When the scheduler is an on-board component of the transmit point or the receive point, the step of communicating the traffic assignments may include implementing a scheduling policy, e.g., storing the traffic assignments in a scheduling table, etc.

In some embodiments, the traffic assignments are generated and/or communicated to the transmit point or the receive points prior to establishment of the unified air interface. For example, the traffic assignments may be communicated to a base station prior to a radio access link being established between the base station and the UE, e.g., prior to a handover, prior to a link establishment, etc. In such embodiments, the step of identifying a unified air interface may comprise identifying or classifying air interfaces over which to apply the traffic assignments, e.g., uplink interfaces, downlink interfaces, air interfaces to cell-edge users, air interfaces established between devices having a specific characteristic or capability, etc. For example, the traffic assignments may apply a set of scheduling policies for communicating traffic over air interfaces extending to a certain class of UEs, e.g., cell-edge UEs, next-generation UEs, etc.

Figure 4:
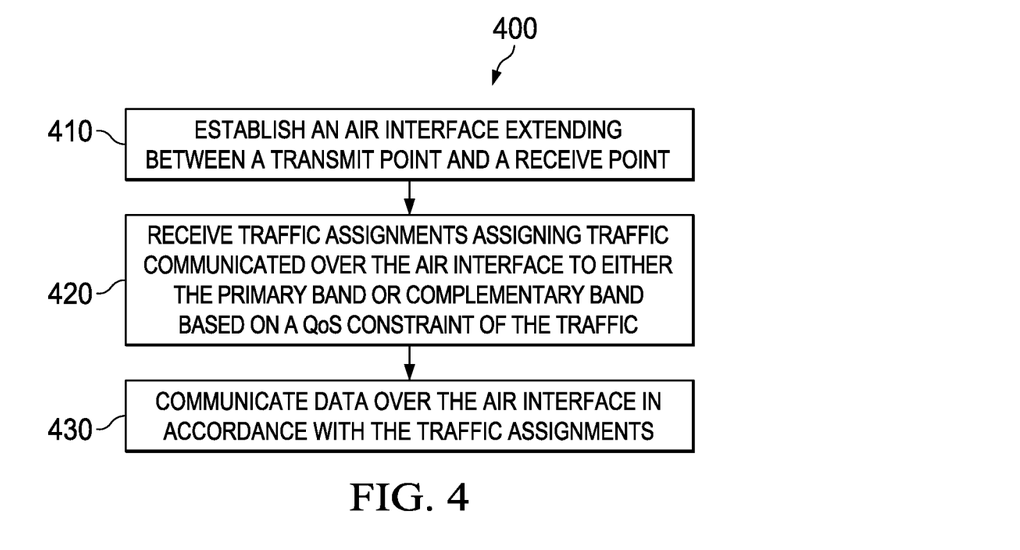
FIG. 4 illustrates a flowchart of an embodiment method for communicating traffic over either the primary or complementary band of an adaptive air interface.

FIG. 4 illustrates a method 400 for communicating traffic over either the primary or complementary band based on traffic assignments received from a scheduler, as might be performed by a transmit point or a receive point. As shown, the method 400 begins at step 410, where a unified air interface is established between the transmit point and the receive point. Next, the method 400 proceeds to step 420, where traffic assignments are received from a scheduler. The traffic assignments assign traffic to either the primary band or complementary band based on QoS constraints of the traffic. Thereafter, the method 400 proceeds to step 430, where data is communicated over the unified air interface based on the traffic assignments.

Figure 5:
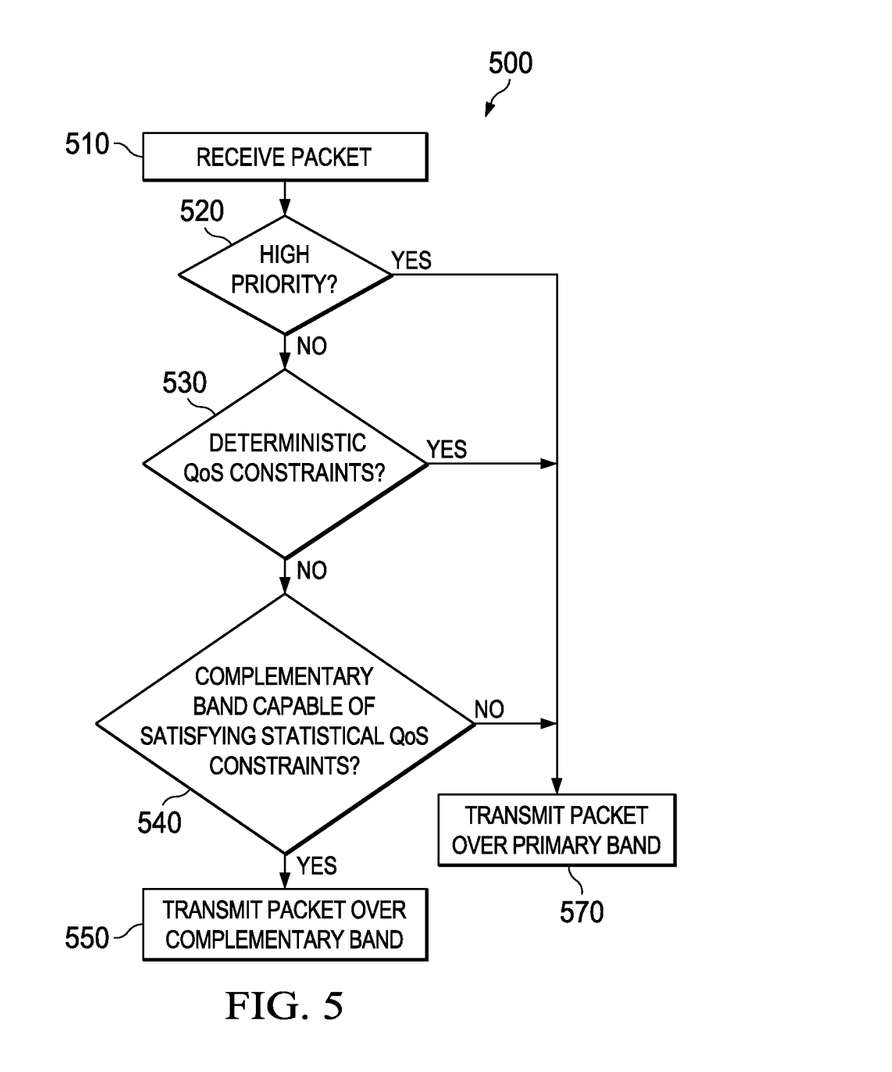
FIG. 5 illustrates a flowchart of another embodiment method for communicating traffic over either the primary or complementary band of an adaptive air interface.

In some embodiments, traffic may be assigned to either the primary or complementary band based on one or more QoS parameters of the traffic. FIG. 5 illustrates a method 500 for communicating traffic over either the primary or complementary band based on QoS parameters of the traffic, as might be performed by a transmit point. As shown, the method 500 begins at step 510, where a packet is received by the transmit point. Next, the method 500 proceeds to step 520, where the transmit point determines whether a priority level of the packet exceeds a threshold. If so, the packet is transmitted over the primary band at step 570. Otherwise, the method proceeds to step 530, where the transmit point determines whether the packet is associated with a deterministic QoS constraint. If so, the packet is transmitted over the primary band at step 570. Otherwise, the method proceeds to steps 540, where the transmit point determines whether the complementary band is capable of satisfying a statistical QoS constraint of the packet. In not, the packet is transmitted over the primary band at step 570. If the complementary band is capable of satisfying a statistical QoS constraint of the packet, then the packet is transmitted over the complementary band at step 550.

Figure 6:
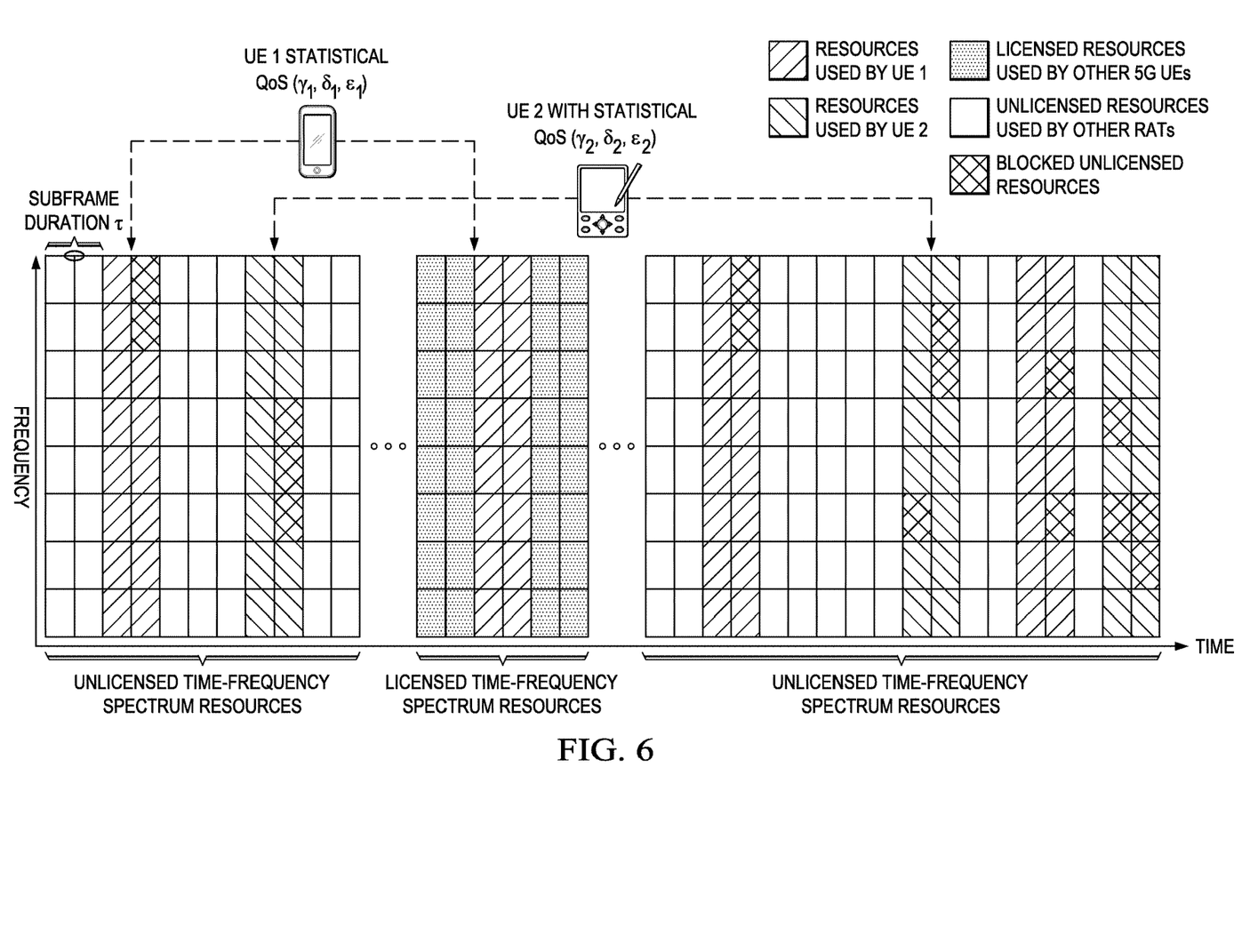
FIG. 6 illustrates a diagram of an embodiment network architecture adapted to provide QoS-driven integrated spectrum access.

In some embodiments, traffic flows may be multiplexed over the primary and complementary bands. In such embodiments, different proportions of traffic may be allocated to the respective primary and complementary bands based on a QoS constraint of the traffic. FIG. 6 illustrates an embodiment network architecture adapted to provide QoS-driven integrated spectrum access. In this example, a first UE (UE1) has a first set of statistical QoS constraints ($\gamma_1$, $\delta_1$, $\varepsilon_1$), while a second UE (UE2) has a second set of statistical QoS constraints ($\gamma_2$, $\delta_2$, $\varepsilon_2$) that is different that the first set of statistical QoS constraints. As shown, traffic associated with the first UE is multiplexed over both the primary and complementary spectrums, while traffic associated with the second UE is communicated exclusively over the complementary spectrum. The blocked unlicensed resources may be indicate a collision between transmissions of the first UE or the second UE and other devices attempting to access grant-less resources of the complementary band.

In some embodiments, wireless networks may create pools of spectrum (licensed and unlicensed), and route traffic through the pools in accordance with the capacity and reliability of the network. The traffic in the licensed and unlicensed pools can be sent using different waveforms selected in accordance with the characteristics of the frequency bands and the projected traffic in each band.

The routing may be done with the recognition that the unlicensed spectrum may be less reliable than the licensed spectrum, e.g., due to the presence of other users and/or interference caused by appliances such as microwave ovens or other 5G RATs controlled by same or different operators or belonging to other RATs such as Wi-Fi systems.

Aspects of this disclosure provide systems and methods for performing wireless transmission spanning both licensed and unlicensed spectrum bands via a unified air interface (AI), such as a next generation or 5th generation air interface. Aspects of this disclosure may increase the overall system capacity, while also satisfying application-specific quality of service (QoS) requirements. Aspects of this disclosure extend wireless networks into unlicensed spectrum to improve network capacity. Aspects of this disclosure provide dynamic switching techniques between licensed and unlicensed spectrum; flexible cross-spectrum load balancing; minimized interference over licensed spectrum; and a reduction in demands for licensed spectrum. The licensed spectrum, also referred to as the primary band and/or core band/spectrum, may be used for high priority traffic and traffic with deterministic QoS requirements. It may serve as fallback spectrum (e.g., on an as needed basis) for traffic having statistical QoS requirements. The unlicensed spectrum, also referred to as the complementary band and/or supplementary band/spectrum, may be used for traffic offloading, and in some embodiments may be used for best-effort traffic and traffic with statistical QoS requirements.

Figure 7:
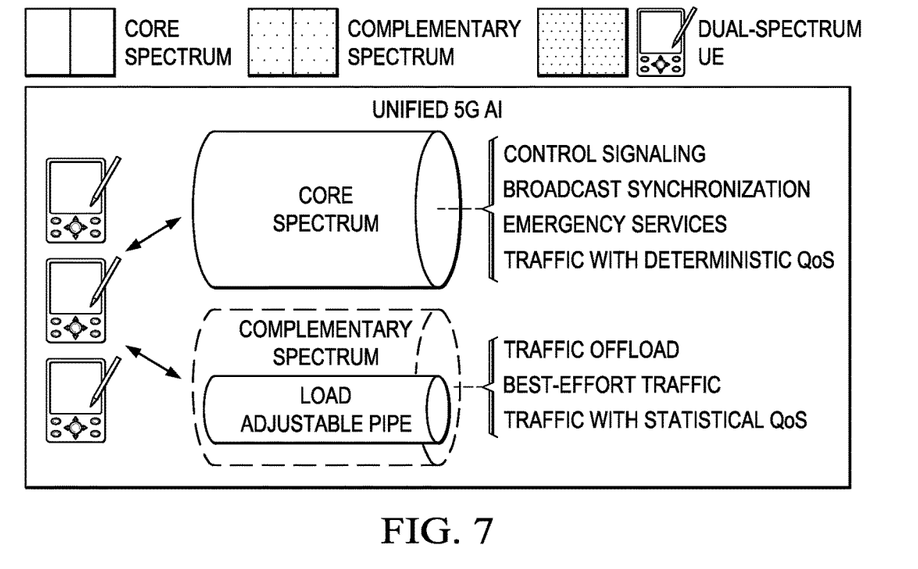
FIG. 7 illustrates a diagram of an embodiment unified air interface for supporting wireless transmissions spanning both the primary and complementary bands.

FIG. 7 illustrates an embodiment unified air interface for supporting wireless transmissions spanning both the primary and complementary bands. The primary band may be used for higher priority traffic, such as control signaling, emergency services, security, network access, broadcasts, synchronization channels, and traffic with deterministic QoS requirements. The unlicensed spectrum can be used opportunistically for traffic offloading purposes, and for best-effort (delay-tolerant) traffic (e.g. content download such as movies, pictures and music), as well as traffic with statistical QoS requirements. Network elements can dynamically switch traffic between the primary and complementary band to satisfy traffic-type and/or application-specific QoS requirements. This provides for a load-aware spectrum expansion/retraction In an embodiment, the complementary spectrum is used for a variety of tasks such as data offloading traffic from the primary band, and for load-aware demand-based adaptive spectrum expansion-retraction. It should be noted that because different spectrum bands are being used, different Air Interfaces (AIs) can be used for the primary and complementary bands. Alternatively, the same air interface can be used to carry transmissions spanning both the primary and complementary bands. In an embodiment, a spectrum type dependent SoftAI provides different transmission parameters (e.g., physical layer (PHY) designs) for the primary band and complementary band. This may allow for different waveforms, different access schemes, frame structure, channelization, etc. A virtual resource association (V-RA) based joint radio resource management (RRM) scheme can be employed to determine the demand for unlicensed spectrum considering transmit point (TP) cooperation and UE cooperation. A key performance indicator (KPI) monitoring mechanism for licensed spectrum fall back operation can be added to ensure QoS requirements are met.

Figure 8:
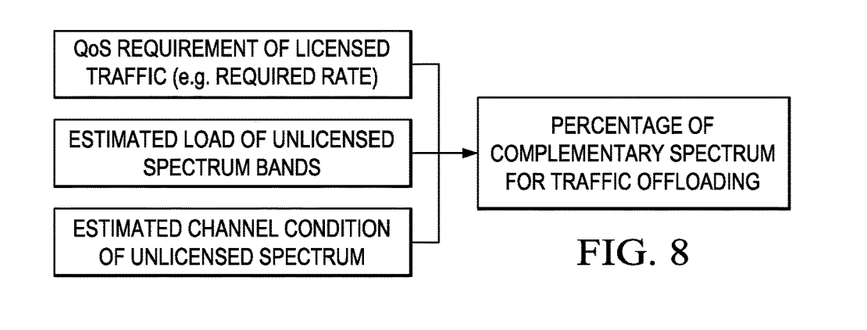
FIG. 8 illustrates a block diagram of an embodiment algorithm for determining a percentage of an extended spectrum over which to offload traffic.

FIG. 8 illustrates a block diagram of an embodiment algorithm for determining a percentage of an extended spectrum over which to offload traffic. The percentage of complementary band used for licensed traffic offloading can be flexibly and dynamically adjusted for the sake of fairness and optimized performance, e.g., in order to reduce the impact on other co-existing systems based on factors such as average traffic load in the unlicensed bands, channel conditions in the licensed and unlicensed spectrum, and licensed traffic QoS requirements such as minimum rate, delay sensitivity, priority, and others, meanwhile enhancing the performance of the 5G RAT through load-aware traffic offloading.

Spectrum sensing can be used to identify unused portions of the unlicensed spectrum to be opportunistically used for traffic offloading. OFDM is the most commonly used multicarrier waveform, but it is known to suffer from high out-of-band side lobes of its power spectral density. This may cause adjacent channel interference problems for co-existing systems and require the usage of guard bands. Alternatively, dynamic access to the complementary band may require the use of more spectrally contained and scalable baseband waveforms.

Figure 9:
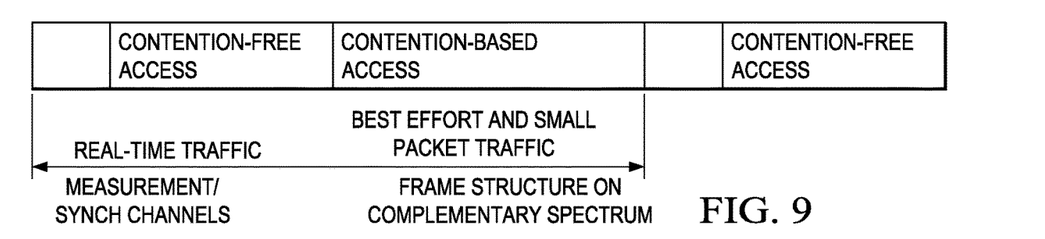
FIG. 9 illustrates a diagram of an embodiment frame structure.

Filtering can be used to reduce the out-of-band emissions of OFDM. Filtered-OFDM (F-OFDM) with adaptive filters dynamically designed for specific frequency fragments can be a more spectrally efficient and scalable waveform for dynamically accessing non-contiguous fragments of the unlicensed spectrum OFDM/OQAM is a filter bank multi-carrier (FBMC) waveform which is more spectrally contained than OFDM waveform (no need for guard band or cyclic prefix) and also offers more flexibility in dynamic spectrum sharing environments such as the unlicensed spectrum and may offer better performance than F-OFDM at the cost of more complexity and higher latency Aspects of this disclosure provide a spectrum-type dependent multicarrier system that combines the use of a proven multicarrier waveform such as OFDM in the primary band and/or a waveform that is more suitable for dynamic spectrum sharing environments such as F-OFDM or FBMC waveforms in the complementary band Spectrum access in the extended unlicensed spectrum may be required to abide by some regulations in certain regions such as listen-before-talk (LBT) regulations. An adaptive and flexible frame structure in the complementary band can accommodate regulatory restrictions such as LBT mechanism as well as allow for transmission of measurement and synchronization channels. In one embodiment the frame structure in the unlicensed spectrum where the time duration for contention-free and contention-based access can be adjusted according to periodic channel sensing results as shown in FIG. 9.

Scheduled grant-based access may be used on the primary band, while contention-based access may be used on the complementary band. Using contention based access on the complementary band may allow the spectrum to be shared with co-existing systems. In an embodiment, two contention-levels can be defined. The first is an inter-Radio Access Technology (RAT) contention, while the second is an Intra-RAT contention. In an Inter-RAT contention is between different radio access technologies using the complementary band (e.g. between 5G RAT and other RATs). In an Intra-RAT contention, contention is between similar technology entities (e.g. 5G network entities with best-effort traffic controller by the same and/or different 5G operators).

In an embodiment, a specially designed MAC protocol is used to efficiently use the complementary band and properly handle the two levels of contention on the complementary band. This can allow for some form of LBT random access procedure, a central entity may decide whether 5G RAT should use the complementary band based on the average traffic load on the unlicensed spectrum. When the unlicensed band is sensed to be lightly loaded, the central entity may adaptively increase the probability for 5G RAT to access the unlicensed spectrum and vice versa. Such a central entity can use either scheduled or contention-based access for managing intra-RAT contention.

The centralized controller can be used to select which spectrum is to be used by which UEs depending on application scenario, traffic type, QoS and security requirements. Alternatively, rules and conditions could be pushed to the UE to allow for the UE to participate in the decision process.

In one exemplary scenario, a high QoS data such as voice, operator-specific services or high security data bearers can be transmitted over licensed spectrum to ensure the QoS requirements are met. Meanwhile, Elastic traffic e.g. best effort and delay tolerant data bearers can be transferred over the unlicensed (and less reliable) spectrum. The centralized controller can continuously or periodically measure the QoS being offered over the unlicensed band and dynamically switch UEs and traffic back to licensed spectrum whenever the expected QoS cannot be guaranteed. A fall-back mechanism can be employed to ensure that whenever QoS requirements cannot be met over the unlicensed spectrum, a fall back to the licensed spectrum takes place.

Assume $UE_i$ has periodic traffic with QoS characteristics that are captured by three parameters $(\gamma_i, \delta_i, \varepsilon_i)$, where $\gamma$ is a Packet arrival rate, $\delta$ is a Maximum tolerable jitter (difference between the times of 2 successive packet departures and the time of 2 successive packet arrivals) and $\varepsilon$ is an Acceptable probability of jitter violation.

For UEs with deterministic QoS guarantees, $\varepsilon_i$ equals zero. Since there is no margin for jitter violation in this case, then the centralized controller assigns UEs with deterministic QoS to use the licensed spectrum. In order to achieve efficient usage of spectrum resources, the centralized controller may assign unlicensed spectrum resources for UEs with statistical QoS requirements. Unlicensed spectrum may be unreliable, so its resources are characterized by a certain blocking rate q. The centralized controller can monitor the average blocking rate over the unlicensed spectrum and based on these characteristics assign the UEs with statistical QoS to use the unlicensed spectrum as long as QoS is within acceptable levels e.g. q <$\varepsilon_i$.

Those skilled in the art will appreciate that existing solutions do not provide a solution that allows for integrated spectrum access method that efficiently utilizes both licensed and unlicensed spectrum bands using a unified air interface while at the same time maximizing the overall system capacity and ensuring QoS constraints for diverse traffic types (e.g., elastic versus inelastic traffic) are met. The above discussed solution can take advantage of application-specific QoS characteristics to efficiently utilize both licensed and unlicensed spectrum in order to enhance the performance of 5G radio access networks.

Figure 10:
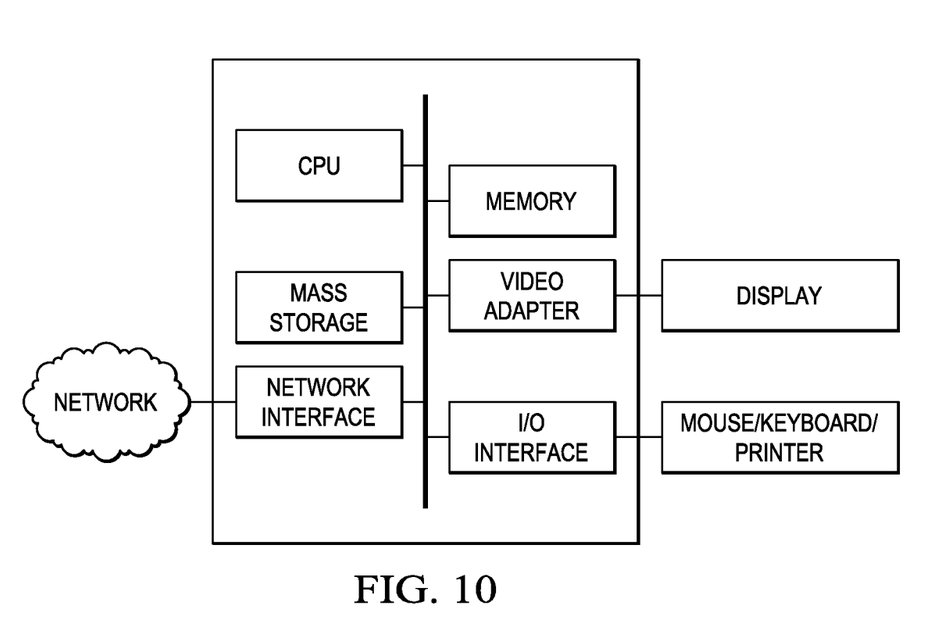
FIG. 10 illustrates a diagram of an embodiment computing platform.

FIG. 10 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 11:
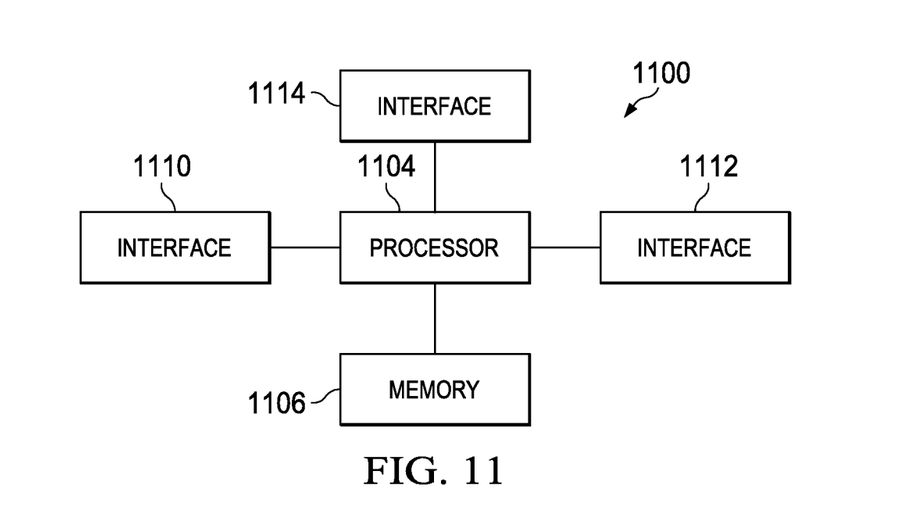
FIG. 11 illustrates a diagram of an embodiment communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, and a plurality of interfaces 1110, 1112, 1114, which may (or may not) be arranged as shown in FIG. 11. The processor 1104 may be any component capable of performing computations and/or other processing related tasks, and the memory 1106 may be any component capable of storing programming and/or instructions for the processor 1104. The interfaces 1110, 1112, 1114 may be any component or collection of components that allows the communications device 1100 to communicate using a cellular signal, and may be used to receive and/or transmit information over a cellular connection of a cellular network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for allocating traffic over licensed and unlicensed bands, the method comprising:
   identifying a unified air interface extending between a transmit point and a receive point, the unified air interface being adapted to use a common physical and medium access control (MAC) connection operating in accordance with a common cellular radio access technology (RAT) to transport wireless signals over both a primary band licensed for cellular communication and a complementary band reserved for unlicensed communication;
   generating, by a scheduler, traffic assignments for a traffic flow communicated over the unified air interface using the common physical and MAC connection operating in accordance with the common cellular RAT for communicating the traffic flow over the primary band and the complementary band, the traffic assignments assigning each packet in the traffic flow to be transported over either the primary band or the complementary band in accordance with a type of the each packet in the traffic flow and a quality of service (QoS) constraint of the each packet in the traffic flow, the QoS constraint comprising at least one of a latency requirement, a jitter requirement, a packet ordering requirement, a dropped-packet rate, a throughput requirement, or an error rate; and
   communicating the traffic assignments to the transmit point or the receive point.

2. The method of claim 1, wherein the traffic assignments assign a first packet of the traffic flow to be transported over the primary band when the first packet of the traffic is associated with a deterministic QoS constraint.

3. The method of claim 2, wherein the traffic assignments assign a second packet of the traffic flow to be transported over the complementary band when the complementary band is capable of satisfying a statistical QoS constraint of the second packet of the traffic flow.

4. The method of claim 3, wherein the traffic assignments assign a third packet of the traffic flow to be transported over the primary band when the complementary band is incapable of satisfying a statistical QoS constraint of the third packet of the traffic flow.

5. The method of claim 1, wherein the traffic assignments assign a first packet of the traffic flow to be transported over the primary band when the QoS constraint of the first packet the traffic flow satisfies a criteria; and
   wherein the traffic assignments assign a second packet the traffic flow to be transported over the complementary band when the QoS constraint of the second packet of the traffic flow does not satisfy the criteria and when a channel condition of the complementary band is sufficient to satisfy the QoS constraint of the second packet of the traffic flow.

6. The method of claim 5, wherein the traffic assignments assign a third packet of the traffic flow to be transported over the primary band when the channel condition of the complementary band is not sufficient to satisfying the QoS constraint of the third packet of the traffic flow.

7. The method of claim 6, wherein the QoS constraint of a fourth packet of the traffic flow satisfies the criteria when the latency requirement of the fourth packet of the traffic flow exceeds a threshold.

8. The method of claim 6, wherein the QoS constraint of a fourth packet of the traffic flow satisfies the criteria when the jitter requirement of the fourth packet of the traffic flow exceeds a threshold.

9. The method of claim 1, the generating comprising:
   when the type of a first packet of the traffic flow is an elastic traffic type, assigning the first packet of the traffic flow to be transported over the complementary band; and
   when the type of the first packet of the traffic flow is an inelastic traffic type, assigning the first packet of the traffic flow to be transported over the primary band.

10. The method of claim 1, wherein the type of a first packet of the traffic flow is an elastic traffic type, the generating comprising:

generating a first traffic assignment assigning the first packet of the traffic flow to be transported over the complementary band;

determining that the QoS constraint is not met for the first packet of the traffic flow over the complementary band; and in response to the determining, generating a second traffic assignment that switches a second packet of the traffic flow from the complementary band to the primary band.

11. A scheduler comprising:

a processor; and a non-transitory computer readable storage medium storing programming for execution by the processor, the programming including instructions to:

identify a unified air interface extending between a transmit point and a receive point, the unified air interface being adapted to use a common physical and medium access control (MAC) connection operating in accordance with a common cellular radio access technology (RAT) to transport wireless signals over both a primary band licensed for cellular communication and a complementary band reserved for unlicensed communication;

generate traffic assignments for a traffic flow communicated over the unified air interface using the common physical and MAC connection operating in accordance with the common cellular RAT for communicating the traffic flow over the primary band and the complementary band, the traffic assignments assigning each packet in the traffic flow to be transported over either the primary band or the complementary band in accordance with a type of the each packet in the traffic flow and a quality of service (QoS) constraint of the each packet in the traffic flow, the QoS constraint comprising at least one of a latency requirement, a jitter requirement, a packet ordering requirement, a dropped-packet rate, a throughput requirement, or an error rate; and communicate the traffic assignments to the transmit point or the receive point.

12. A method for communicating traffic over licensed and unlicensed bands, the method comprising:

establishing a unified air interface extending between a transmit point and a receive point, the unified air interface being adapted to use a common physical and medium access control (MAC) connection operating in accordance with a common cellular radio access technology (RAT) to transport wireless signals over both a primary band licensed for cellular communication and a complementary band reserved for unlicensed communication;

receiving traffic assignments from a scheduler, the traffic assignments assigning a traffic flow communicated over the unified air interface using the common physical and MAC connection operating in accordance with the common cellular RAT for communicating the traffic flow over the primary band and the complementary band to either the primary band or the complementary band in accordance with a type of each packet in the traffic flow and a quality of service (QoS) constraint of the each packet in the traffic flow, the QoS constraint comprising at least one of a latency requirement, a jitter requirement, a packet ordering requirement, a dropped-packet rate, a throughput requirement, or an error rate; and communicating data over the unified air interlace in accordance with the traffic assignments.

13. The method of claim 12, wherein the traffic assignments assign a first packet of the traffic flow to be transported over the primary band when the QoS constraint of the first packet of the traffic flow satisfies a criteria; and wherein the traffic assignments assign a second packet of the traffic flow to be transported over the complementary band when the QoS constraint of the second packet of the traffic flow does not satisfy the criteria and when a channel condition of the complementary band is sufficient to satisfy the QoS constraint of the second packet of the traffic flow.

14. The method of claim 13, wherein the traffic assignments assign a third packet of the traffic flow to be transported over the primary band when the channel condition of the complementary band is not sufficient to satisfying the QoS constraint of the third packet of the traffic flow.

15. The method of claim 14, wherein the QoS constraint of a fourth packet of the traffic flow satisfies the criteria when the latency requirement of the fourth packet of the traffic flow exceeds a threshold.

16. The method of claim 14, wherein the QoS constraint of a fourth packet of the traffic flow satisfies the criteria when the jitter requirement of the fourth packet of the traffic flow exceeds a threshold.

17. The method of claim 12, wherein the communicating the data over the unified air interface in accordance with the traffic assignments comprises:

receiving, by the transmit point, incoming data addressed to the receive point;

transmitting the incoming data over the unified air interface via wireless transmissions spanning the primary band when the QoS constraint of the incoming data satisfies a criteria; and transmitting the incoming data over the unified air interface via wireless transmissions spanning the complementary band when the QoS constraint of the incoming data fails to satisfy the criteria and a channel condition of the complementary band is capable of satisfying the QoS constraint of the incoming data.

18. The method of claim 12, wherein the communicating the data over the unified air interlace in accordance with the traffic assignments comprises:

scheduling, by the receive point, the data to be communicated over grant-based resources of the primary band when the QoS constraint of the data satisfies a criteria.

19. The method of claim 18, wherein the communicating the data over the unified air interlace in accordance with the traffic assignments comprises:

receiving, by the receive point, a first packet of the traffic flow over grant-less resources of the complementary band when the QoS constraint of the data does not satisfy the criteria and when a channel condition of the complementary band is capable of satisfying the QoS constraint of the first packet of the traffic flow.

20. The method of claim 12, wherein the communicating the data over the unified air interlace in accordance with the traffic assignments comprises:

performing, over the unified air interface, a first wireless transmission spanning the primary band in accordance with a first set of transmission parameters; and performing, over the unified air interlace, a second wireless transmission spanning the complementary band in accordance with a second set of transmission parameters, the second set of transmission parameters being different than the first set of transmission parameters.

21. The method of claim 20, further comprising:
receiving a software defined radio (SDR) instruction, the SDR instruction instructing the transmit point to perform transmissions over the primary band in accordance with the first set of transmission parameters, and to perform transmissions over the complementary band in accordance with the second set of transmission parameters.

22. The method of claim 20, wherein the first set of transmission parameters comprise a different waveform, frame structure, or access scheme, than the second set of transmission parameters.

23. The method of claim 12, wherein the transmit point comprises a user equipment (UE) or a base station (BS).

24. A transmit point comprising:
a processor; and
a non-transitory computer readable storage medium storing programming for execution by the processor, the programming including instructions to:
establish a unified air interface extending between the transmit point and a receive point, the unified air interface being adapted to use a common physical and medium access control (MAC) connection operating in accordance with a common cellular radio access technology (RAT) to transport wireless signals over both a primary band licensed for cellular communication and a complementary band reserved for unlicensed communication;
receive traffic assignments from a scheduler, the traffic assignments assigning a traffic flow communicated over the unified air interface using the common physical and MAC connection operating in accordance with the common cellular RAT for communicating the traffic flow over the primary band and the complementary band to either the primary band or the complementary band in accordance with a type of each packet in the traffic flow and a quality of service (QoS) constraint of the each packet in the traffic flow, the QoS constraint comprising at least one of a latency requirement, a jitter requirement, a packet ordering requirement, a dropped-packet rate, a throughput requirement, or an error rate; and
communicate data over the unified air interface in accordance with the traffic assignments.

25. A method for receiving traffic over licensed and unlicensed bands, the method comprising:
establishing a unified air interface extending between a transmit point and a receive point, the unified air interface being adapted to use a common physical and medium access control (MAC) connection operating in accordance with a common cellular radio access technology (RAT) to transport wireless signals over both a primary band licensed for cellular communication and a complementary band reserved for unlicensed communication; and
receiving, by the receive point, a traffic flow over the unified air interface using the common physical and MAC connection operating in accordance with the common cellular RAT for communicating the traffic flow over the primary band and the complementary band, wherein a first packet of the traffic flow is received over the primary band when a type of the first packet of the traffic flow and a quality of service (QoS) constraint of the first packet of the traffic flow meets a first criteria, and wherein a second packet of the traffic flow is received over the complementary band when the QoS constraint of the second packet of the traffic flow meets a second criteria, the QoS constraint comprising at least one of a latency requirement, a jitter requirement, a packet ordering requirement, a dropped-packet rate, a throughput requirement, or an error rate.

26. The method of claim 25, wherein the QoS constraint of the first packet of the traffic flow meets the first criteria when the QoS constraint comprises a deterministic QoS constraint of the first packet of the traffic flow.

27. The method of claim 25, wherein the QoS constraint of the first packet of the traffic flow meets the second criteria when the QoS constraint comprises a statistical QoS constraint of the first packet of the traffic flow and when a condition on the complementary band is sufficient to satisfy the statistical QoS constraint of the first packet of the traffic flow.

28. The method of claim 25, wherein the receive point comprises a user equipment (UE) or a base station (BS).

29. A receive point comprising:
a processor; and
a non-transitory computer readable storage medium storing programming for execution by the processor, the programming including instructions to:
establish a unified air interlace extending between a transmit point and the receive point, the unified air interface being adapted to use a common physical and medium access control (MAC) connection operating in accordance with a common cellular radio access technology (RAT) to transport wireless signals over both a primary band licensed for cellular communication and a complementary band reserved for unlicensed communication; and
receive a traffic flow over the unified air interface using the common physical and MAC connection operating in accordance with the common cellular RAT for communicating the traffic flow over the primary band and the complementary band, wherein a first packet of the traffic flow is received over the primary band when a type of the first packet of the traffic flow and a quality of service (QoS) constraint of the first packet of the traffic flow meets a first criteria, and wherein a second packet of the traffic flow is received over the complementary band when the QoS constraint of the second packet of the traffic flow meets a second criteria, the QoS constraint comprising at least one of a latency requirement, a jitter requirement, a packet ordering requirement, a dropped-packet rate, a throughput requirement, or an error rate.

* * * * *

UNITED STATES PATENT AND TRADEMARK OFFICE
CERTIFICATE OF CORRECTION

PATENT NO. : 10,548,071 B2
APPLICATION NO. : 14/670069
DATED : January 28, 2020
INVENTOR(S) : Amine Maaref et al.

Page 1 of 1

It is certified that error appears in the above-identified patent and that said Letters Patent is hereby corrected as shown below:

In the Claims

In Column 12, Line 2, Claim 1, delete "interlace" and insert --interface--.

In Column 14, Line 43, Claim 18, delete "interlace" and insert --interface--.

In Column 14, Line 49, Claim 19, delete "interlace" and insert --interface--.

In Column 14, Line 63, Claim 20, delete "interlace" and insert --interface--.

In Column 16, Line 32, Claim 29, delete "interlace" and insert --interface--.

Signed and Sealed this
Twenty-eighth Day of July, 2020

Andrei Iancu
*Director of the United States Patent and Trademark Office*